(12) United States Patent
Barendse

(10) Patent No.: US 12,418,534 B2
(45) Date of Patent: Sep. 16, 2025

(54) PERMISSIONS MANAGEMENT SYSTEM AND METHOD

(71) Applicant: Peter Barendse, Boston, MA (US)

(72) Inventor: Peter Barendse, Boston, MA (US)

( * ) Notice: Subject to any disclaimer, the term of this patent is extended or adjusted under 35 U.S.C. 154(b) by 243 days.

(21) Appl. No.: 18/106,300

(22) Filed: Feb. 6, 2023

(65) Prior Publication Data
US 2024/0267382 A1 Aug. 8, 2024

(51) Int. Cl.
*H04L 29/00* (2006.01)
*H04L 9/40* (2022.01)

(52) U.S. Cl.
CPC .................................. *H04L 63/101* (2013.01)

(58) Field of Classification Search
CPC .... G06F 3/0647; H04L 63/101; H04L 63/107
See application file for complete search history.

(56) References Cited

U.S. PATENT DOCUMENTS

| | | | | |
|---|---|---|---|---|
| 6,038,563 A * | 3/2000 | Bapat | .................. | G06F 21/6227 707/999.009 |
| 6,085,191 A * | 7/2000 | Fisher | ................. | G06F 21/6227 707/999.009 |
| 7,219,339 B1 * | 5/2007 | Goyal | ................. | H04L 41/0879 717/142 |
| 10,114,944 B1 * | 10/2018 | Li | ........................... | G06F 21/57 |
| 10,152,384 B1 * | 12/2018 | Amit | ................... | G06F 11/1451 |
| 10,348,767 B1 * | 7/2019 | Lee | ......................... | H04L 67/10 |
| 10,354,077 B2 * | 7/2019 | Oh | ......................... | G06F 21/51 |
| 11,314,707 B1 * | 4/2022 | Del Sordo | .............. | H04L 63/10 |
| 12,028,226 B1 * | 7/2024 | Bhave | ..................... | H04L 43/14 |
| 2004/0160464 A1 * | 8/2004 | Reyna | ...................... | G06F 8/34 715/854 |
| 2005/0183115 A1 * | 8/2005 | Maruyama | ......... | H04N 21/4828 348/E7.071 |
| 2006/0282498 A1 * | 12/2006 | Muro | ..................... | H04L 67/12 709/203 |
| 2007/0047558 A1 * | 3/2007 | Ayers | .................... | H04L 63/101 370/400 |
| 2011/0215900 A1 * | 9/2011 | Corradino | ......... | H04M 1/72463 340/5.52 |
| 2015/0350380 A1 * | 12/2015 | Choi | ..................... | G06F 3/0482 709/203 |
| 2016/0232365 A1 * | 8/2016 | Oh | ......................... | G06F 21/51 |
| 2016/0266778 A1 * | 9/2016 | Rawlinson | ............. | B60K 35/50 |
| 2016/0277374 A1 * | 9/2016 | Reid | ................... | H04L 63/0435 |
| 2017/0034654 A1 * | 2/2017 | Oberbeck | .......... | H04N 21/6405 |

(Continued)

*Primary Examiner* — Don G Zhao
(74) *Attorney, Agent, or Firm* — James M. O'Neill

(57) ABSTRACT

A computer-implemented apparatus and method includes two or more user terminals, one or more services, communication channels among the user terminals and services; one or more lists of permissions stored in computer memory, a recursively-defined computer command vocabulary, wherein the recursively-defined computer command vocabulary comprises a "get" command with which a user can retrieve the value of a permission, depending on the whether the value of the permission allowing the user to use that "get" command on that permission has been set to true, and a "set" command with which a user can set the value of a permission, depending on the whether the value of the permission for that user to use that "set" command on that permission has been set to true.

8 Claims, 4 Drawing Sheets

(56) References Cited

U.S. PATENT DOCUMENTS

| | | | |
|---|---|---|---|
| 2017/0142124 A1* | 5/2017 | Mukhin | G06F 21/30 |
| 2018/0217783 A1* | 8/2018 | Hildstrom | G06F 3/0643 |
| 2019/0245856 A1* | 8/2019 | Irwan | H04L 9/0643 |
| 2021/0266329 A1* | 8/2021 | Fuhry | G06F 21/604 |
| 2021/0390080 A1* | 12/2021 | Tripathi | G06F 21/62 |
| 2022/0138842 A1* | 5/2022 | Drucker | G06Q 20/4016 |
| | | | 705/44 |
| 2022/0245114 A1* | 8/2022 | Wang | G06F 16/2272 |
| 2022/0245276 A1* | 8/2022 | Gupta | G06F 21/6218 |
| 2022/0269851 A1* | 8/2022 | DeNeui | G06F 40/166 |
| 2023/0342166 A1* | 10/2023 | DeNeui | G06F 9/451 |
| 2023/0363939 A1* | 11/2023 | Constant | A61G 7/0524 |
| 2024/0267382 A1* | 8/2024 | Barendse | H04L 63/101 |

* cited by examiner

I want to:

Modify [ Sgt. Bill ], 's permissions to: listen [ 1st Sgt. Phil ], to be: False enter this command

I want to: [ Modify ], [ 1st Sgt. Phil ], 's permissions to: [ Modify ], [ Sgt. Bill ], 's permissions to: [ listen ], [ 1st Sgt. Phil ], to be: False ], to be: False ]

FIG. 4

PERMISSIONS MANAGEMENT SYSTEM AND METHOD

BACKGROUND

A common situation, whether in communication, file access, politics or military, is one in which there are many actors that may or may not do something according to a designed system of permissions (e.g., read or write to files, speak to the other actors, transfer money, fire weapons, etc.)

A simple model of permissions like the one embodied in the UNIX filesystem, while suitable for simple purposes, is not sufficient in many ways. The same is true for Role-based and Access-based access control schemes. For example, there is no configuration of the model which allows a user to modify a file only when two other users agree. Another user can either set the relevant file's permissions (i.e., they are the owner or a 'superuser'), or they can't, in which case they have absolutely no control over what other users can do with the file. A third user can perhaps give control over the file's permissions to this user, but only if the third user is already the owner or a superuser, in which case they already have the ability to grant the permissions in question directly, so no agreement is needed. In short, there is no easy way to create hierarchy, consensus or delegation of power.

SUMMARY

To solve the drawbacks of the prior art permission systems, the present invention introduces two recursive (self-referential) elements: permissions to see permissions, and permissions to change permissions, and a method of storing and calculating these permissions. It also introduces a novel user interface for setting and getting these permissions

BRIEF DESCRIPTION OF THE FIGURES

FIG. 3 illustrates a user interface displayed at a user terminal in a permissions management system, according to an embodiment.

FIG. 4 illustrates a user interface, extended one step beyond that shown in FIG. 3, displayed at a user terminal in a permissions management system, according to an embodiment.

DETAILED DESCRIPTION

Embodiments of a permission system are described herein. The system is flexible enough to model every situation, yet natural enough to be used in many everyday cases by novices, but also simple enough for an experienced administrator to quickly learn to administer. It is also not exclusive of, or included in, but rather compatible with other standard permissions features like groups, owner/superuser roles, mandatory access control, discretionary access control, role-based access control, rule-based access control, etc., either by implementation directly by (within) the present system, or by a software modification/connection with another standard system.

Figure 1:
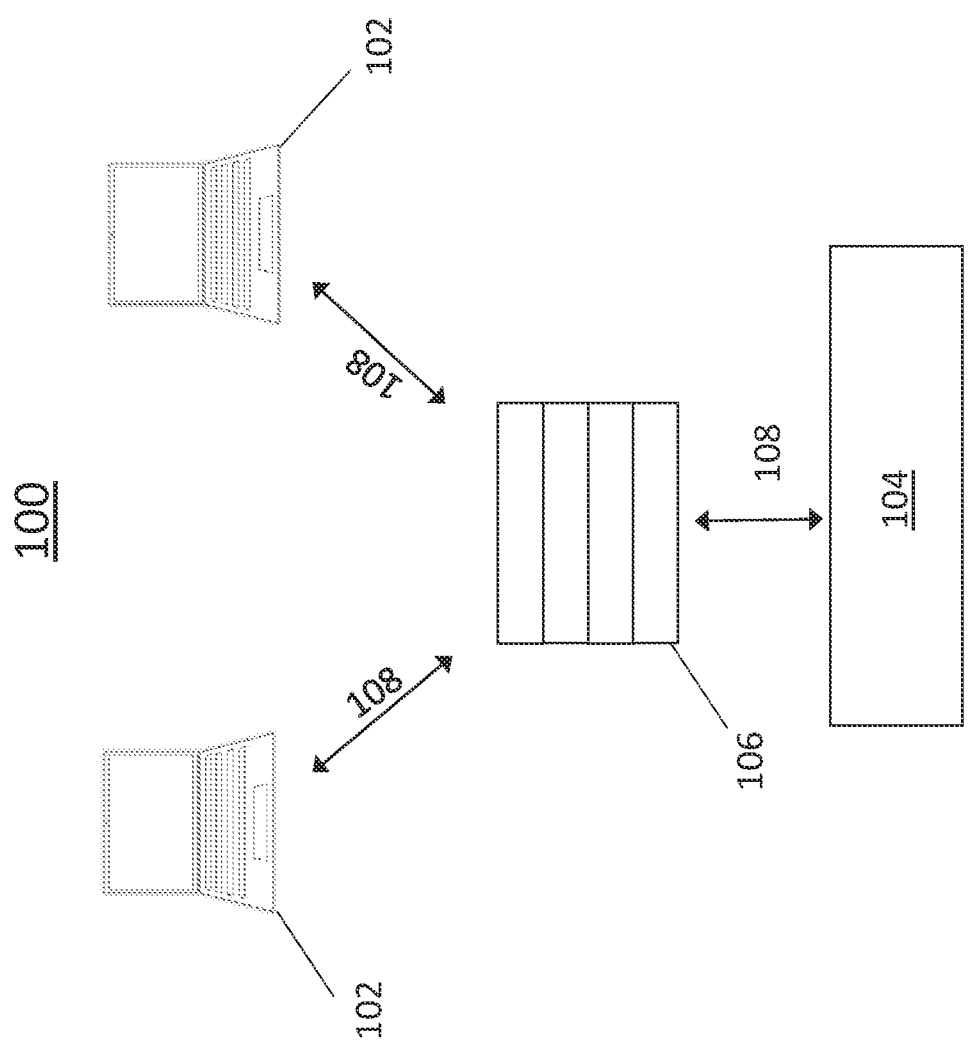
FIG. 1 illustrates a diagram of a centralized permissions management system between a main server and several user terminals, according to an embodiment.

Referring to FIG. 1, an embodiment of a permissions management system 100 comprises one or more user or client terminals 102 or "users", e.g., a computer terminal or GUI, an encrypted app, a telephone voice menu, a panel of physical switches, etc. The permissions management system 100 further comprises one or more "services" 104. The services 104 may be actions or functions a user may wish to perform, such as access to files and other computer resources, use of a printer, or an array of physical motors, actuators, lights, etc. In one embodiment, the permissions management system 100 further comprises a main server 106. The main server 106 may be a computer/cloud server which holds a data structure or list of master permissions ("MLP") for all user terminals 102 and all services 104, as well as memory and processors (the "Permissions Engine") to read and write to the MLP, receive and send messages to the user terminals 102 and control access to the services 104, permissions management system 100. The permissions management system 100 further comprises a network of communication channels 108 connecting them. These communication channels 108 are 2-way, can be either direct or indirect (through multiple steps in the network), can be mediated by any physical information-conveying medium, e.g., fiber optic, radio, ethernet, etc.), transmit classical or quantum communication, and use any kind of encoding. The main server 106 is in 2-way communication, directly or indirectly, with every user terminal 102 and service 104 in the permissions management system 100. In this discussion, only digital communication will be considered. However, the concepts described herein are also applicable to other types of communication, e.g., quantum encryption methods and/or analog encodings.

For the centralized configuration as shown in FIG. 1, all communication (e.g., "requests" and "responses") happens with the main server 106 mediating and controlling the communications, as each communication is first read by the main server 106 before (possibly) being passed on to other user(s) and/or service(s). In the main server 106, The MLP can be considered equivalent to a 2D array (spreadsheet) with at least 3 columns: [user (or "owner"), permission, truth-value], the last column indicating whether that permission in that row should be granted to that user (or pattern of users) in that same row. Other possible columns include the author of the permission, the time created, etc.

The main server 106 holding the MLP responds to three types of incoming requests from the user terminals 102: (a) "basic" requests to do something (via the main server 106 directing a service 104), such as send a message, or start an engine, (b) requests to view a certain permission or group of permissions from the list, and (c) requests to modify the list in a way that changes a certain permission or group of permissions. The latter two types of requests (also called "get)" and "set( )" requests) can be written formally as: view(user, permission), and modify(user, permission, truth-value).

The main server 106 reviews the MLP to determine if the request should be granted, and may enable an action to be performed and/or respond with a message back to the user about the status of the request, possibly containing the permissions that the user requested to view (if the request was of type (b)), or the main server 106 will possibly modify the MLP (if the request was a valid type (c) request).

An advantageous aspect of the presently disclosed permission system is that these latter two types of requests are recursive in their second argument, the 'permission'. That is. "modify('User A', view('User B', permission), truth-value)", "view('User B', modify(user3, permission, truth-value))", "modify('User A', view('User B', modify(user3, permission, truth-value)), truth-value)", etc. are also valid forms of request, assuming "User A", "truth-value", "permission" etc. are valid users, truth-values, and permissions, respectively. Additionally, wildcard symbols can be used at any level of this recursion, and, if nested inside the request, will be taken either literally (meaning as a literal part of the enclosing permission) or taken to represent a set of complete requests (one for each way to substitute for the wildcard).

Upon receiving a request 'req' from a user terminal 102. e.g., 'User A', the main server 106 evaluates the following algorithm (with possible variations in parentheses): For all 3 types, it begins by using a pattern-matching function matchQ( ) (defined below) to find the unique (or most recent, smallest, most specific, with the highest-ranking author, etc.) permission/row in the MLP: [user permission truth-value] that satisfies matchQ(req, permission) and matchQ(User A, user). If truth-value is either 'true' (permission granted), (or 'secretly granted', or another affirmative value), the main server 106 will do the requested action (or send back the data, or modify the MLP, according to the type of User A's request). If truth-value is anything else, or if there is no such permission, the requested action is not taken, and a message may or may not be sent back to User A. For example, if User A requests to download files, his request could be granted if the MLP contains one of the following rows: ['User A', download_files, true], [*, download_files, true], [User *, download_files, true], or ['User A',*, true], but only if the following row is not present at higher-priority (earlier or smaller, etc.): ['User A', download_files, false]. If a request of type (a) or (b) is granted, the actions taken by the main server 106 are one of the following: either enable the requested action to be performed, or, in the case of (b), return an (possibly encrypted, signed, etc.) message to the issuing user containing the requested truth-value (and possibly the unique permission or permissions, if all permission rows such that matchQ(req, permission and matchQ('User A', user) are returned), or a message saying no such permission exists (which may or may not be equivalent to returning 'false'). If a type (c) request is received, the MLP may modified, or simply appended. This way, exceptions to new (or higher-priority) permissions can fallback onto older (or lower-priority) more general permissions according to matchQ( ).

In requests, as in permissions, users and permissions and truth-values can all be, or contain, wildcard characters. There are multiple possible types of wildcard characters. For example, a wildcard in the first position of a view or modify request means the permission applies to "any user." Similarly, a wildcard in the second position of a view or modify request means "any permission" (or possibly any non-nested permission). In addition, the wildcard (and conditional wildcard) when used within any of the three permission fields (user, permission, or truth-value), means just what matchQ ( ) will interpret it as (there is no difference in which wildcard is thought of as operating 'first'). For example, the request modify(*, modify(*, download_files, *), false) will, if the requester has permission to do this, add the permission [*, modify(*, download_files, *) false] to the MLP. And so in the future, when any user makes a request that matches modify(*, download_files,*), such as modify('User B', download_files, *), will be denied (unless there is a more recent or higher-priority permission in place).

Another configuration is possible since, while a '*' in a permission may essentially expand into a whole class of permissions when added within a modify( ) and then used by (on) individuals to which that '*' applies (as in the example), within a view( ) (or possibly within a nested modify( )), there is an ambiguity as to whether '*' refers to all permissions that match that '*' (a class of view requests) or the permission(s) that literally contain '*'. In the embodiments disclosed herein, both are possible configurations. This is enabled by the fact that matchQ( ) comes with an "escape mechanism" (for regular expression parsers like Perl, this is the backslash character '\'), and this is exactly the second interpretation when used as already described.

Besides 'true' and 'false', there are other possible values for the truth-value of a permission. For example, the truth-value of a permission can be 'Secretly-true'/'Secretly-false': these are effectively like 'true'/'false', but cannot viewed by anyone (with the possible exceptions of all users that match the 1st column (owner) of the original permission.) The difference between this and just setting the actual permission to view the original permission to false is that others may still believe that they have the ability to view it. i.e., the system can lie about the permission.

Figure 2:
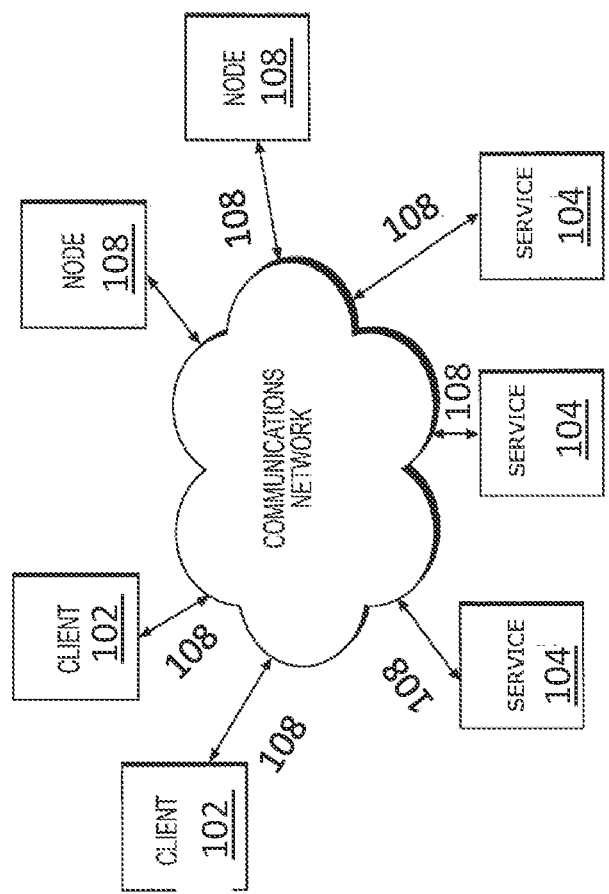
FIG. 2 illustrates a diagram of a decentralized permissions management system between several user terminals and services over a distributed network, according to an embodiment.

Referring to FIG. 2, an embodiment of a permissions management system 200 with a decentralized or distributed configuration is depicted. The distributed configuration comprises user terminals 102, services 104, and may comprise other nodes 110, connected to each other either directly or in a network, such as a cellular network or the Internet. This distributed configuration can perform the same functions as the centralized configuration comprising the main server 106, with the MLP stored as a (usually encrypted) data structure of permissions by at least one of the user terminals 102, and possibly services 104 and other nodes 110 on the network, either in parts or as duplicates. The network may perform an algorithm with similar effects to what the main server does in the centralized configuration using multi-party computation and/or homomorphic encryption, or equivalently by "smart contract", wherein a distributed ledger network uses consensus or stake to execute an agreement in a way that no party can break once entered into. A public/private key pair may be created for each user and service, (or each pair), to communicate either to each other directly, or mediated by the network. In this case, the network may also store a list of approved requests (the "LAR") that have been made all the users (i.e., all requests made by a user with the necessary permissions to make their request), and the users and services 104 could be parties to a single smart contract or separate smart contracts.

Each user terminal 102 can send a request to the network, either to:
  a. activate a service (to certify the user's request and add/or it to the LAR),
  b. view a permission in the shared MLP, or
  c. change the shared ledger of permissions, (change or append the MLP)

Once a request is sent across the network, all or an adequate consensus of nodes 110 on the network consult their copy of the MLP, and will either agree that the request is valid (verify that it was requested by a user with the proper authority to perform it, according to the MLP), or fall to agree that it is valid. If the request is deemed valid, one of the three following things will happen:
  a. if it is a basic service request, the appropriate service will find or receive the request, and the network's verification of it, and act according to the request.
  b. If it is a view request, the consensus of verifying nodes will send through the network the (usually encrypted) value of the requested permission.

c. if it is a modify request, it is incorporated into the distributed MLP by the network (modifying the permissions).

Each service is programmed to be in continual contact with the network (either passively or actively checking it), and whenever it finds that a request of itself has been verified, either by seeing the verification, or that it has been added to the LAR distributed ledger, it performs the requested task.

Despite having the complete set of permissions and requests shared and processed among the network, it is also possible with this method to prevent nodes 110, user terminals 102 and services 104 from knowing any permissions or requests other than their own. This can be accomplished using a system of zero-knowledge proofs (ZKPs) or of "secret smart contracts" (possibly also in conjunction with a homomorphic encryption scheme and/or multiparty computation), in a way such that a command is verified and carried out if (and, with a probability as high as needed, only if), the user issuing the command has permission to do so (soundness and completeness, in the parlance of ZKPs)

By using ZKPs to represent permissions as one or more kinds of private "tokens" (or "coins") such as those used in private blockchains and cryptocurrency such as ZCash, in which is the requesting user is the "prover" (in the language of ZKP) who demonstrates to a consensus part of the network (the "verifier") that the prover has the proper token to perform its request, essentially performing a matchQ( ) function, that works on encrypted requests and encrypted patterns stored in the distributed MLP, to achieve this agreement or disagreement while keeping the requests, and requesters, private. In this "private" implementation, the computation of reading a request and determining whether to create an encrypted request for the desired service, or to append the encrypted MLP with another encrypted permission, is done in a way so that it cannot be decrypted by requesting user.

During use of such a private distributed configuration, communication would start with a user request of the same specification as in the centralized configuration. The request is then encrypted and sent over the network, and communication will end with the same MLP and outcomes for services 104 as with the centralized configuration. In a private cryptocurrency system, "coins" can be transacted between users in a distributed ledger as long as the transaction satisfies an easily computable formula (for example, the number of coins sent should be equal to the number received in the case of a standard cryptocurrency transaction), in a way that is sound, complete and zero-knowledge.

In the present case, the number of coins in a user's wallet uniquely encodes, using arithmetic properties such as the unique factorization into primes, the set of permissions that user has, each permission being intermediately constructed as a vector formed from the spreadsheet row, from the sequence of words and characters in "owner(truth-value (target( . . . )))", with unique characters marking the beginning/end of each permission The formula for a valid private transaction is as follows: In the modify case, the requesting user (the "prover") attempts to prove (in zero-knowledge) to the network (the "verifier") that the number of coins in their wallet has a whole number factor that represents the permission to do the specific modification to the specific target user's permissions. If the transaction is verified, then, if a new permission is being added, a number of coins are added to the target's wallet which is equivalent to multiplying the number of coins the target previously had by a unique factor that represents the new permission created. This additional amount of coins created in the target user's wallet is a factor of the permission that is in the requester's wallet used to grant this new permission (with a new beginning marker added): it is the requester's permission with the requester's user (the owner) and the Boolean value that represents the requester's ability to add this permission both cut off from the initial part the permission vector, leaving the target user now in the initial (owner) position of the new permission. This way the target now has a number of coins containing factor of which it can use to prove it has the new permission which it has been granted, in the same way the first requesting proved they had the permission to grant it. If this new permission (or one subsuming it) is already part of the target user's wallet, then no new coins are added. In this way, if the modify command is instead removing said permission. The valid transaction is one where a number of coins is subtracted from the targets wallet which results in the division of the targets number of coins by the permission that is removed. If the target user has a number of coins which does not contain that factor, then that transaction will fail to be verified, but in this case the target did not have that permission anyway.

The view and basic command transactions begin in the same way as the modify command: The network first verifies that the requesting user has an appropriate number of coins to perform the command (again, a number which has a factor representing the permission to do the command).

In the case of a basic command, once the appropriate permission is verified, a number of coins is put in the wallet of the service being used. The number of coins is encoded in the request itself and must match the action part of that permission (which determines what actions of the user is allowed to request of that service) in the same way that a new permission granted by a modify command matches the latter part of the permission that allowed it to be granted.

For a view command, two methods are possible: One way to do this would be for the requesting user to issue two commands, one representing a proof that there is a permission for the target user to do the command the first user is inquiring about, and another command representing a proof that there is no such permission. The requesting user will then know the answer by which proof gets verified. Alternatively, a number of coins representing the answer can be placed in a secret account owned by the requesting user.

Embodiments disclosed herein comprise a telescoping user interface 300 installed into each user terminal 102. FIGS. 3 and 4 illustrate an example of such a telescoping user interface 300. This interface comprises, at first, a blank request (a sentence with empty input fields, dropdown menus, and/or other common input controls), and a request button that sends the request to the main server 106 and/or other users, services and nodes.

In this method for a person (user) to construct requests, the user fills in each field until none are blank. To begin, the user chooses from a single drop-down (or other UI element) among the types of requests: view( ), modify( ), or any of the basic (type (a)) requests available in their system. If they choose view( ), modify( ), the single dropdown changes to resemble the command structure, view(user, permission) or modify(user, permission, truth-value), or possibly a more natural language sentence, but with new inputs/drop-downs in the place of "user", "permission", and "truth-value". The dropdown in place of the internal permission now works the same way as the original dropdown, leading to a telescoping sentence (FIG. 4) that can be sent as a request, once all fields are filled in by the user.

Although the present disclosure is not so limited, the following numbered examples demonstrate one or more aspects of the disclosure.

Example 1. A computer-implemented apparatus, comprising: two or more user terminals; one or more services; communication channels among the user terminals and services; a recursively-defined computer command vocabulary, the recursively-defined computer command vocabulary comprising a set of "basic" (non-recursive) commands, with which users can perform actions or call services, a "get" command with which a user can retrieve the value of a permission, depending on whether the value of the permission allowing the user to use that "get" command on that permission has been set to true; and a "set" command with which a user can set the value of a permission, depending on whether the value of the permission for that user to use that "set" command on that permission has been set to true; and one or more lists of permissions stored in computer memory, wherein each permission contains at least one command together with a corresponding permitted user(s), and wherein the ability of a particular user to run a particular command is determined by a permission corresponding to said command.

Example 2. The computer-implemented apparatus of example 1, wherein the computer-implemented apparatus has a centralized configuration and comprises a main server; a master list of permissions stored in the main server; and communication channels through which each of the users is communicatively connected to the main server.

Example 3. The computer-implemented apparatus of example 1, wherein the computer-implemented apparatus has a decentralized configuration and comprises: a communication channel between each user and each service either directly or via a network; and a list of permissions distributed across a number of users, services, and/or other nodes (henceforth "nodes") of the network.

Example 4. The computer-implemented apparatus of example 1, wherein the permissions and commands are kept in an encrypted form while being communicated and verified, such that a command will be verified if, and with arbitrarily high probability only if, the user issuing the command has permission to do so, and such that the identity of a user issuing a command, the content of that command, and the success or failure of that command remains hidden from all but the user issuing the command, the service being called, in the case of a "basic" command, and, in the case of a "set" command, the user(s) whose permission(s) are being modified, and any other users that may have permission(s) to "get" the specific permission(s) being "get" or "set".

Example 5. The computer-implemented apparatus of example 1, wherein the computer uses a pattern-matching software function to determine if a user's command is permitted, and if so, what actions are taken and what changes are made, if any.

Example 6. A computer-implemented telescoping user interface for users, the user interface comprising: at first, a blank command consisting of a sentence or functional representation of an empty permission, input element(s), and a command button; as the user selects from the input elements, the sentence or functional representation expands itself with more empty input fields or dropdown menus until the user fills them all, at which point the user may send the command thus constructed; and a feedback mechanism in which a main server or network gives an appropriate response to the user issuing the command.

Example 7. A method of communicating via a computer-implemented apparatus, the method comprising: providing two or more user terminals, one or more services, and communication channels among the user terminals and services; communicating between the two or more user terminals via the communication channels; wherein the communicating comprises using a recursively-defined computer command vocabulary and one or more lists of permissions stored in computer memory, each permission containing at least a command together with corresponding permitted user(s); wherein the ability of a user of one of the user terminals to run one of the commands is determined by inspecting the permission(s) corresponding to the command; wherein the recursively-defined computer command vocabulary comprises: a set of "basic" commands, with which the user can use the services to perform actions; a "get" command with which the user can retrieve the value of a permission, depending on whether the value of the permission for the user to use that "get" command on that permission has been set to true; and a "set" command with which the user can set the value of a permission, depending on whether the value of the permission for the user to use that "set" command on that permission has been set to true.

Example 8. The method of example 7, further comprising: providing a main server; storing a master list of permissions in computer memory in the main server; setting up a communication link between each of the user terminals and the main server, through which commands and permissions are transmitted; and setting up a communication link between each of the services and the main server, through which valid commands are transmitted to the relevant services to be performed.

Example 9. The method of example 7, further comprising: setting up a communication network connecting each of the users and each service either directly or indirectly; maintaining a list of permissions distributed across a number of nodes of the network; broadcasting a command to other nodes by the user; and the network checking the validity of commands by requiring some number of other nodes to agree that a command is allowed by the list of permissions stored by each of the user terminals or nodes of the network.

Example 10. The method of example 9, further comprising: using a pattern-matching software function to determine if the user's command is permitted, and if so, what actions are taken and what changes are made.

Example 11. The method of example 9, further comprising: maintaining a common list of encrypted or hashed permissions across a decentralized network of users, services, and other nodes; sending a message to other nodes on the decentralized network by the user, the message containing at least the command and the sending user's identity, encrypted or cryptographically hashed for use in a zero-knowledge proof scheme; using methods to obfuscate the origin of the message in the decentralized network; verifying in other nodes in the decentralized network that a latest permission in the list of permissions that matches the command, the identity of the user issuing the command, and has a boolean value; and indicating whether the latest permission is granted/affirmed, such that verification happens using a zero-knowledge scheme, such that the command will be verified if, and with arbitrarily high probability only if, the user issuing the command has permission to do so, and such that an identity of an issuing user, content of their command, and success or failure of the command remaining hidden from all but the issuing user, and, in the case of a "basic" command, a service being called, or, in the case of a "set" command, one of the user(s) whose permissions are being modified, and any other ones of the user(s) that may have permission to "get" a specific permission being "get" or "set"; in the case of a "basic" command, after confirming that the "basic" command is valid, the decentralized network permitting the service or command to act accordingly; In the case of a "get" command, after confirming that the command is valid, the decentralized network sending a value of the requested permission, encrypted with the anonymous public key of the issuing user; in the case of a "set" command, after confirming that the command is valid, the decentralized network adding the part of the command that is the new permission to the list of permissions, with the issuing user optionally sending a message containing the new permission, encrypted with a public key(s) of the user(s) whose permissions are being modified by the "set" command.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

As used herein, the term "matchQ( )" refers to a symbolic "pattern-matching" software function, such as implemented by regular expression parsers included in a standard Unix-type operating system, e.g., by Perl interpreters, or Wolfram Language's "MatchQ[ ]" [https//reference.wolfram.com/language/ref/MatchQ.html], matchQ( ) is a function that accepts two inputs: one symbolic expression (either text or another type of structured expression) and one "pattern" (possibly including "wildcard" and/or conditional wildcard characters, logic and/or conditionals) of the same type of expression. The function decides whether the expression matches the pattern, returning either 'true' or 'false'.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

The invention claimed is:

1. A computer-implemented apparatus, comprising:
  two or more user terminals;
  one or more services;
  communication channels among the user terminals and services;
  a recursively-defined computer command vocabulary, the recursively-defined computer command vocabulary comprising a set of "basic" (non-recursive) commands, with which users can perform actions or call services, a "get" command with which a user can retrieve a value of a first permission, depending on whether the value of the first permission allows the user to use the "get" command after the first permission has been set to true; and a "set" command with which a user can set the value of a second permission, depending on whether the value of the second permission allows the user to use the "set" command after the second permission has been set to true; and
  one or more lists of permissions stored in computer memory,
  wherein each permission contains at least one command together with a corresponding permitted user(s),
  wherein the ability of a particular user to run a particular command is determined by a permission corresponding to said command, and
  wherein the computer-implemented apparatus uses a pattern-matching software function to determine if a user's command is permitted, and if so, what actions are taken and what changes are made, if any.

2. The computer-implemented apparatus of claim 1, wherein the computer-implemented apparatus has a centralized configuration and comprises:
  a main server;
  a master list of permissions stored in the main server; and
  communication channels through which each of the users is communicatively connected to the main server.

3. The computer-implemented apparatus of claim 1, wherein the computer-implemented apparatus has a decentralized configuration and comprises:
  a communication channel between each user and each service either directly or via a network; and
  a list of permissions distributed across a number of users, services, and/or other nodes of the network.

4. The computer-implemented apparatus of claim 1, wherein the permissions and commands are kept in an encrypted form while being communicated and verified, such that a command will be verified if, and with arbitrarily high probability only if, a user issuing the command has permission to do so, and such that an identity of a user issuing a command, a content of that command, and a success or failure of that command remains hidden from all but the user issuing the command, the service being called, in case of a "basic" command, and, in case of a "set" command, the user(s) whose permission(s) are being modified, and any other users that may have permission(s) to "get" the specific permission(s) being "get" or "set".

5. A method of communicating via a computer-implemented apparatus, the method comprising:
  providing two or more user terminals, one or more services, and communication channels among the user terminals and services;
  communicating between the two or more user terminals via the communication channels;
  setting up a communication network connecting each of the user terminals and each service either directly or indirectly;
  maintaining a list of permissions distributed across a number of nodes of the communication network;
  broadcasting a command to other nodes by the user;
  the network checking validity of commands by requiring some number of other nodes to agree that a command is allowed by the list of permissions stored by each of the user terminals or nodes of the network; and
  using a pattern-matching software function to determine if the user's command is permitted, and if so, what actions are taken and what changes are made,
  wherein the communicating comprises using a recursively-defined computer command vocabulary and one or more lists of permissions stored in computer memory, each permission containing at least a command together with corresponding permitted user(s);
  wherein the ability of a user of one of the user terminals to run one of the commands is determined by inspecting the permission(s) corresponding to the command;

wherein the recursively-defined computer command vocabulary comprises:
   a set of "basic" commands, with which the user can use the services to perform actions;
   a "get" command with which a user can retrieve a value of a first permission, depending on whether the value of the first permission allows the user to use the "get" command after the first permission has been set to true; and
   a "set" command with which a user can set the value of a second permission, depending on whether the value of the second permission allows the user to use the "set" command after the second permission has been set to true.

6. The method of claim 5, further comprising:
providing a main server;
storing a master list of permissions in computer memory in the main server;
setting up a communication link between each of the user terminals and the main server, through which commands and permissions are transmitted; and
setting up a communication link between each of the services and the main server, through which valid commands are transmitted to relevant services to be performed.

7. The method of claim 5, further comprising:
maintaining a common list of encrypted or hashed permissions across a decentralized network of users, services, and other nodes;
sending a message to other nodes on the decentralized network by the user, the message containing at least the command and a sending user's identity, encrypted or cryptographically hashed for use in a zero-knowledge proof scheme;
using methods to obfuscate an origin of the message in the decentralized network;
verifying in other nodes in the decentralized network that a latest permission in the list of permissions that matches the command, the identity of the user issuing the command, and has a boolean value; and
indicating whether the latest permission is granted/affirmed, such that verification happens using a zero-knowledge scheme, such that the command will be verified if, and with arbitrarily high probability only if, the user issuing the command has permission to do so, and such that an identity of an issuing user, content of their command, and success or failure of the command remaining hidden from all but the issuing user, and, in case of a "basic" command, a service being called, or, in case of a "set" command, one of the user(s) whose permissions are being modified, and any other ones of the user(s) that may have permission to "get" a specific permission being "get" or "set"; in case of a "basic" command, after confirming that the "basic" command is valid, the decentralized network permitting the service or command to act accordingly; in case of a "get" command, after confirming that the command is valid, the decentralized network sending a value of a requested permission, encrypted with an anonymous public key of the issuing user; in case of a "set" command, after confirming that the command is valid, the decentralized network adding a part of the command that is a new permission to the list of permissions, with the issuing user optionally sending a message containing the new permission, encrypted with a public key(s) of the user(s) whose permissions are being modified by the "set" command.

8. A computer-implemented apparatus, comprising:
two or more user terminals;
one or more services;
communication channels among the user terminals and services;
a recursively-defined computer command vocabulary, the recursively-defined computer command vocabulary comprising a set of "basic" (non-recursive) commands, with which users can perform actions or call services, a "get" command with which a user can retrieve a value of a first permission, depending on whether the value of the first permission allows the user to use the "get" command after the first permission has been set to true; and a "set" command with which a user can set the value of a second permission, depending on whether the value of the second permission allows the user to use the "set" command after the second permission has been set to true; and
one or more lists of permissions stored in computer memory,
wherein each permission contains at least one command together with a corresponding permitted user(s),
wherein the ability of a particular user to run a particular command is determined by a permission corresponding to said command
wherein the permissions and commands are kept in an encrypted form while being communicated and verified, such that a command will be verified if, and with arbitrarily high probability only if, a user issuing the command has permission to do so, and such that an identity of a user issuing a command, a content of that command, and a success or failure of that command remains hidden from all but the user issuing the command, the service being called, in case of a "basic" command, and, in case of a "set" command, the user(s) whose permission(s) are being modified, and any other users that may have permission(s) to "get" the specific permission(s) being "get" or "set".

* * * * *